Patented Feb. 26, 1929.

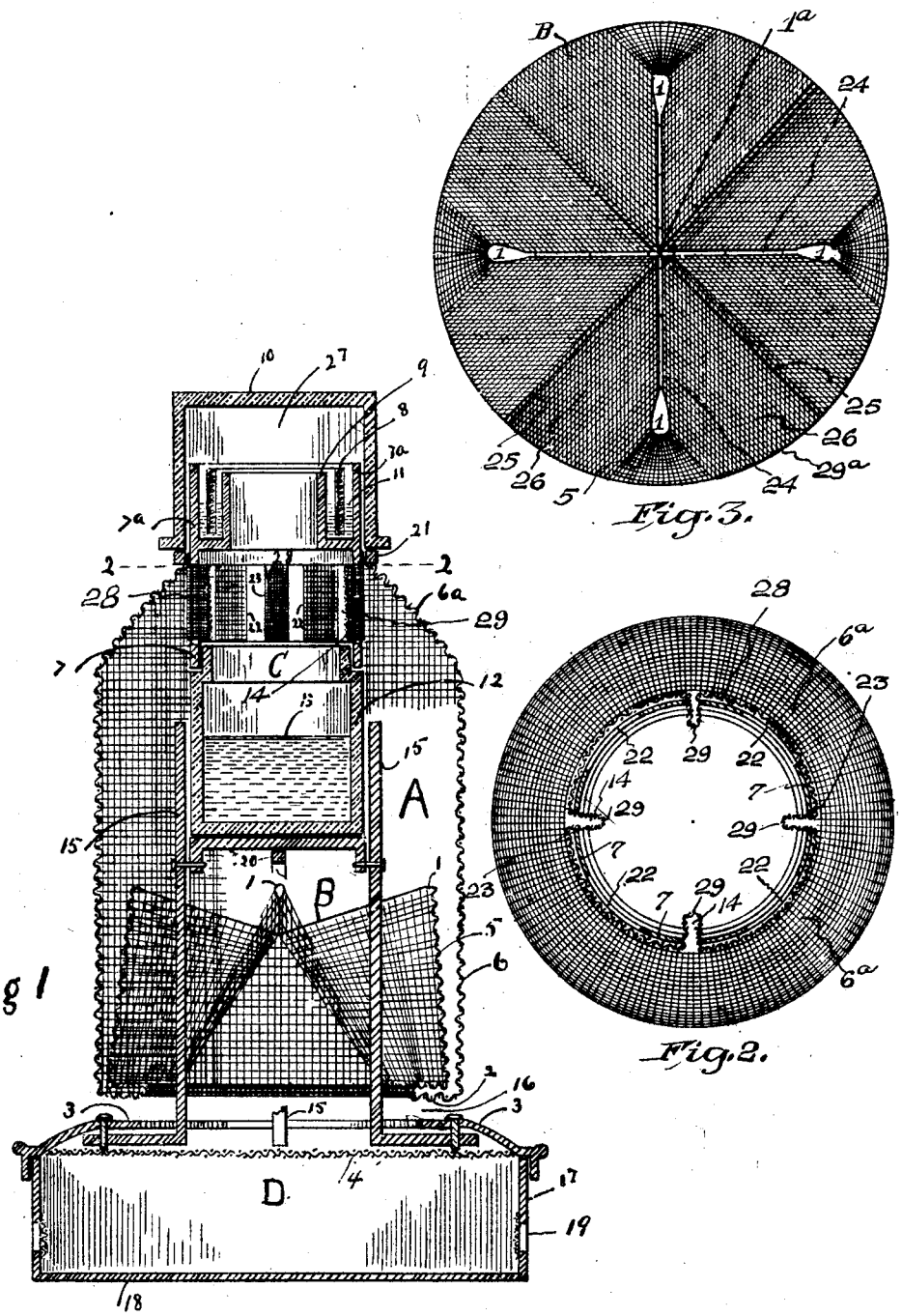

1,703,322

UNITED STATES PATENT OFFICE.

WILLIAM E. D. RUMMEL, OF CHICAGO, ILLINOIS.

SANITARY FLY AND INSECT TRAP.

Application filed May 13, 1921, Serial No. 469,238. Renewed July 14, 1928.

My invention relates to new and useful improvements in insect traps, and more particularly relates to a device of this character adapted to attract and catch such insects as the fly. The general aim is to afford a trap of this sort that is approximately complete and will contribute materially to the attack on the fly as a danger to public and private health.

This end is particularly accomplished in my invention by providing a trap that is highly efficient in operation, humane, durable, sanitary, convenient to care for and operate, and reasonably cheap to construct.

The above and additional objects, which will become apparent as this explanatory description proceeds, are accomplished by such means as are illustrated in the accompanying drawings, described in the following specification, and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts: Figure 1 is a longitudinal vertical section through the central part of a trap made in accordance with my invention. Figure 2 is a horizontal transverse section on the line 2—2 of Fig. 1. Figure 3 is a bottom view of the interior cage B.

Referring to the figures by characters of reference D is a bait chamber having a bottom 18 and cylindrical sides 17 which sides contain ventilators 19 covered with foraminous material. 3 is a wide annular convex flange whose exterior edge is mounted on and over the top of the cylindrical sides 17. Said flange 3 contains a central circular opening the diameter of which opening is approximately the same as the diameter of a central circular opening of a narrow flange 2 located above flange 3 and separated from flange 3 by an annular opening 16. said annular opening 16 being of the width of flange 2 and extending between the two flanges. 4 is a bait protector composed of a circular sheet of foraminous material, preferably of light wire netting, suitably attached to and under flange 3 and attached back of the central opening in said flange preventing the entrance of flies into the bait chamber D through the central opening in 3 and creating a recess between 3 and 4 sufficient to prevent flies from crawling from 4 to 3 normally. 15 are standards and 20 are crosspieces of an interior frame. Said frame is attached to flange 3 by means of L's formed at the lower ends of said standards and attached underneath the flange 3, preferably. C is a cylindrical chamber mounted in said frame and consisting of a well 12, a trap 28, and a cell 27. The well 12 rests on the crosspieces 20 and contains an insecticidal germicidal liquid 13. Said well has a broad opening at the top surrounded by a shoulder on which shoulder rests the frame 7 of the trap 28, and said frame 7 extends from the shoulder of 12 to the top of the annular band 21 and about the circumference of the trap 28. Said trap 28 has ventilators 22 which are openings in the frame 7 covered with foraminous material. Said trap 28 has passageways 23 by which flies pass from the top of the exterior cage A into the interior of the trap 28 and are there entrapped in the chamber C by the trap 28. The passageways 23 are openings in the frame 7 which openings are guarded on the inside of trap 28 by folds of foraminous material. The loops 29 of said folds (see Figure 2) are arranged before said passageways 23 looping toward the interior of trap 28 and away from the passageways 23, guarding said passageways against communication from the interior of the trap 28 through said passageways to the exterior of said trap 28, but facilitating the passage and communication of flies from the exterior of said trap 28 through the passageways 23 into the loops 29 of said folds and finally through exits 14 in the tops of said loops into said trap 28. Said folds are closed at the bottom, and the sides of said folds engage the sides of the openings of the passageways 23 throughout the length of said passageways 23 preventing lateral entrance to said passageways 23 from within the trap 28. Communication is had by trap 28 with cell 27 located above said trap by means of a broad opening at the top of trap 28 approximating the diameter of trap 28, and communication is had by trap 28 with well 12 located below trap 28 by means of a broad opening at the bottom of trap 28 approximating the diameter of trap 28. Communication is had between well 12 and cell 27 through the wide cylindrical opening of the interior of trap 28.

Cell 27 is cylindrical in form and is mounted on and attached to the frame 7 of trap 28.

the exterior side 7ª of the reservoir 9, 7ª of cell 27 being the continuation of the top of the frame 7 of trap 28. 10 is a transparent cylindrical cap forming the top and sides and closing the top and sides of cell 27. The cap 10 rests on the band 21 and contains a wick 8 moistened with an insecticidal germicidal liquid. The cell 27 contains an annular reservoir 9, 7ª whose exterior wall 7ª is a continuation of the frame 7 or may be attached to or free from frame 7. Said reservoir 9, 7ª contains an insecticidal germicidal liquid 11 into which reservoir and into which liquid 11 said wick 8 is in part inserted.

The cap 10 is composed preferably of transparent glass but may be composed of other transparent material or of foraminous material. A is a cylindrical exterior cage composed of foraminous material and having a top 6ª of frusto-conical shape, extending from the margin of said top to the juncture of the frusto-conical top and the body 6 of the exterior cage. The margin of said top is attached to the top of trap 28 under the annular band 21 and above the passageways 23 engaging said tops of said passageways 23 and closing the top of the exterior cage A so as to prevent the escape of flies from the top of A except through said passageways 23. The folds or crimps engaging the tops of the passageways 23 may be made larger than the other folds or crimps in order to provide deeper and broader channels leading to said passageways. The body 6 of the cage A extends downward to and connects with the exterior margin of flange 2 and the lower margin 29ª (Fig. 3) of the interior cage B, closing the bottom of cage A. The interior cage B is composed of folds 26, 5, 24 (Fig. 3) of which 26 are sides of the folds, 5 are the folded ends of the folds, 24 is the top of the fold, 25 are ridges alternating with the folds and 1ª is the center of the top of cage B at which the folds are gathered showing the top of cage B as closed excepting openings 1 formed as exits from B into A. The cage B, the cage A and the flange 2 or any two of these may be formed by a process of folding as indicated in Fig. 1 and is a new method of making a fly trap composed of these parts and is my invention. The folds or crimps 26, 5, 24 may be gathered about and to a central object or area in the central part of the top of cage B and this method of construction is to be preferred in traps of large capacity wherein the capacity of the well 12 is increased by increasing the depth of well 12 and by extending the depth of well 12 into the top of cage B and gathering the folds or crimps of cage B about the bottom of the extended well 12 radiating from the sides of well 12 outward. The number of said folds or crimps in my preferred form of tral is four but this number may be increased or decreased. The folds or crimps composing cage B have their loops at the exterior of said cage forming and closing the sides of cage B and creating in said sides of B on the inside of said cage B channels or grooves that lead from the bottom to the top of the sides of cage B formed in and constituting said sides of the chamber B. The inside of the sides of cage B may be otherwise described as composed of alternate ridges and channels or as composed of alternate ridges and grooves, said grooves or channels being shallow and wide at the base of cage B and growing deeper and narrower as said grooves or channels approach the top of said cage B and lead to the exits 1. The margin of the base of the interior cage B is attached to the exterior margin of the annular flange 2 and to the margin of the base of the exterior cage A or said margin of B may be attached either to the exterior margin of 2 or to the margin of the base of A. The method of forming interior cage B is to use a sheet, preferably rectangular, of foraminous material, preferably about four times as long as wide, and bind together the two short edges of this sheet and gather centrally one of the two remaining free edges of the sheet into approximately equal folds, preferably four in number, with the loop ends 24, 5, 26, Fig. 3, of the folds extending outwardly and the sides 26, Fig. 3 of the loops extending centrally and the openings 1, and 1ª and 1ª, 1 enclosed by the tops of the sides 26 at 24, or the sides of said loops may extend centrally gathered about a central object if so desired, leaving such openings as 1 and 1ª and 1ª, 1 or any one or two of them in the tops of the folds as may be desired for exits. The base of the interior cage may be shaped round or angular to conform to the desired shape of the trap.

The method of forming a flange at the base of the interior cage B is to bend and crimp centrally a strip or part of the interior cage B at and about the base of said interior cage B, said strip being in width preferably about one seventh the heighth of the interior cage B and to be provided for in laying out the sheet of which interior cage B is to be formed.

The method of forming interior cage B and the walls of exterior cage A of one sheet is to use a sheet preferably rectangular of foraminous material said sheet being as long as the periphery or circumference of the trap desired and as wide as the combined heights of the interior cage B and the exterior cage A, the exterior cage being about twice as high as the interior cage B and said periphery or circumference being about four times as long as the height of the interior cage B, and fold that part of said sheet intended for interior cage B over on that part of the sheet intended for the walls of exterior cage A, and bind together the two opposite free short edges of the part intended for interior cage B into a form, and bind together the two opposite free short edges of the part intended for the walls of the exterior cage A into a form, the taller form of the exterior cage A enveloping the shorter form intended for the interior cage B and the two forms united at a common base on the line of fold and gather centrally the free edge of the inner form intended for the interior cage B, said edge to become the top of said interior cage B, into approximately equal folds preferably four in number, with the loop ends 24, 5, 26, Fig. 3, of the folds extending outwardly and the sides 26, Fig. 3 of the loops extending centrally and the openings 1 and 1ª and 1, 1ª enclosed between the tops 24, Fig. 3 of the sides of the folds 26, Fig. 3, or if so desired the interior cage B may envelop in the central part of its top an object and said loops may be so gathered with the sides 26, Fig. 3 extending centrally to and about such object leaving the openings 1, and 1ª, and 1, 1ª or any one or more of them as may be desired for exits. In case an object is enveloped in the center of the interior cage B the opening 1ª may contain such object or may be larger than said object as desired. The periphery of the trap may be shaped round or angular or rectangular, and in the larger sized traps a wire of the shape of the periphery of the trap desired may be fastened to the base of the trap to hold it in the desired shape, and there is practically no limit to the shape and forms of the interior cage B, the number and shape of the folds, open or closed, from one to most any number depending on the size of the trap, the size of the folds, the shape of the trap and whether some folds are closed and some are open.

The method of forming interior cage B, the walls of exterior cage A, and flange 2, (Fig. 1) out of a sheet of foraminous material is to use a sheet of foraminous material, preferably rectangular, in length said sheet being as long as the periphery of the desired trap; in width said sheet should be as wide as the height of the interior cage B plus the height of the walls of the exterior cage A plus twice the width of flange 2, (Fig. 1). The height of the interior cage B should be about one fourth the periphery of the trap, and the height of the walls of the exterior cage A should be about twice the height of the interior Cage B, and the width of flange 2, (Fig. 1) should be about one inch. Lay out the sheet of foraminous material as long as the periphery of the trap and add about one half inch to this length for binding the edges together. Lay off the width of the sheet of foraminous material in two sections. Section one of this width should be as wide as the height of the interior cage B plus about one inch; section two of this width should be as wide as the height of the exterior cage A plus about one inch. Fold section one over on section two, draw together and bind the two opposite free short edges of section one, draw together and bind the two opposite free short edges of section two so that a taller form composed of section two envelops a shorter form composed of section one, the two forms being united and joined at a common base on a line of fold on which section one was folded over on section two. Gather centrally the free top edge of the inner form for the top of the interior cage B into approximately equal folds preferably four in number with loop ends 24, 5, 26, (Fig. 3) of said folds extending outwardly and the sides 26, (Fig. 3) of said loops extending centrally leaving the openings 1, and 1ª, and 1, 1ª, in the tops 24, (Fig. 3) of the loops or folds. The loops 24, 5, 26, (Fig. 3) may extend centrally gathered about a central object, if so desired, leaving any or all of the exits 1, 1ª, or 1, or 1ª in the tops of the folds for exits. At the common base of the said two forms and adjacent to the line of fold on which section one of the sheets of foraminous material was folded over on section two centrally and simultaneously bend and crimp an approximately equal part of each of said forms about one inch wide or as wide as intended and laid out for flange 2 (Fig. 1) to form said flange. Any sequence in which these operations may be performed in the method of forming cage B, cage A and flange 2, (Fig. 1) is my invention though not described herein as to claim all the combinations of sequences of said operations would be to submit a multitude of claims which it would seem the law does not contemplate in a claim for a method of forming. Flange 2 with the recess above said flange, flange 3 with the recess below said flange, and the annular opening 16 between flange 2 and flange 3 constitute a trap which device traps the fly immediately upon the entrance of the fly into the fly trap and said trap at the entrance of the main trap may be referred to as an entrance trap. The insecticidal germicidal liquid 13, and 11, and used to moisten the wick 8 in the cell 27, is preferably the common kerosene of commerce. The introduction of an insecticidal germicidal liquid in a chamber of a fly trap to hasten the death of flies within said trap or to cause the death of flies within said trap or for both of said purposes is a new invention when the death or the hastening of the death of the flies or both effects are caused by the contact of the flies with said liquid and is my invention.

In using the trap, the parts are assembled as hereinbefore described and the bait is placed in the bait chamber D which is large enough to hold a goodly quantity of bait. Since the space for bait is ample, the bait may be of several kinds each kind being placed in a separate receptacle a plan that has many advantages. The air circulates naturally through the ventilators 19 up through the bait protector 4 and on out through the trap. The flies will be attracted to a point outside the trap where the odors from the bait are the strongest and this point will probably be at some point of the opening 16 in the entrance trap. The trap being amply lighted and the odors strong the flies are readily attracted through the opening 16 and are trapped immediately by the entrance trap. After passing through the entrance trap the flies settle on the sides of the interior cage B or on the bait protector 4. While seeking the bait through the bait protector 4 they soon learn that they can not get through the bait protector to the bait and take wing to the sides and channels of the interior cage B and at once start up the light and airy channels of the slightly inclined sides of B to the openings 1 in the tops of the folds or crimps and pass into the exterior cage A. The openings 1 in the top of B and the shape of the top of B constitute a second trap which the flies have now passed and are hopelessly and safely trapped. The fact that they did not have access to the bait keeps them active and on the move from the first entrance to the trap and they naturally pass outward to the sides of the exterior cage A and upward seeking egress. The frusto-conical top of A readily leads them towards the chamber C and as they rapidly grow restless and eager to find egress they soon find and pass through the passageways 23 into chamber C and are trapped within C by the trap 28. The flies are now closely confined and immediately seek the abundant light of the cell 27 coming through the transparent cap 10 and begin to fight against the top and sides of 10 for egress settling soon on the wick 8 the only object that offers a place of rest. Here their feet become moistened with the insecticidal germicidal liquid of the wick and quickly take to wing again to fight the top and sides of 10 only to tire and settle again on the wick and become further moistened with the insecticidal germicidal liquid in said wick and in this manner they repeat the process described above soon to fall helplessly into the insecticidal germicidal liquid 13 within the well 12 from which they never emerge but become submerged and are killed humanely where they remain harmless and where the germs on their bodies and feet and legs are destroyed in a sanitary manner. All of this usually happens in less time than it takes to tell it here. The humane and sanitary workings of the trap are of a high order. The further fact that the flies do not come in contact with bait prevents their contaminating the bait with the germs on their bodies and prevents their depositing their eggs to hatch in the bait.

A large number of dead flies may be confined within a narrow space in the well 13. Said well may be cleaned out by removing the cap 10 dipping the flies out through the top of the well 12 and through 28 and 27 with a strainer dipper leaving the insecticidal germicidal liquid in the well for continued use. Said liquid being the common kerosene of commerce does not evaporate rapidly and said well 12 and the reservoir 9, $7^a$ do not need to be replenished but a few times each season. The bait may be placed in the bait chamber D by removing the flange 3 which may be lifted from the top of the bait chamber and with said flange the superstructure above said flange in a convenient way. The upper part of the trap continues to operate and kill the flies even while this process of baiting the trap is going on which baiting takes but a few moments. Rain does not affect the trap as it is constructed to shed the rain. The bait is secure from chickens, dogs, rats etc. The trap catches and kills all flies that pass through opening and thus has a high degree of efficiency. It is made of a high grade of material and is durable and is not repulsive to operate and for these and other reasons has a tendency to encourage its use and create an interest in eradicating the fly. My trap is new and the method of making my trap is new.

What is claimed is :—

1. An insect trap comprising a lower cylindrical chamber having ventilators covered by foraminous material, an annular flange having a central opening said flange mounted on the top of the sides of said lower chamber, a sheet of foraminous material attached beneath said flange and back of the interior marginal edge of said flange, an interior frame projecting above said flange having standards attached to said flange, a well containing an insecticidal germicidal liquid mounted in said frame, a cylindrical trap mounted on said well communicating with said well said trap having passageways from an exterior cage leading to the interior of said trap, said passageways guarded on the interior of said trap by folds of foraminous material arranged before said passageways the sides of which folds engage the sides of said passageways, a cylindrical cell attached to and mounted on the top of said trap and communicating with said trap the top and sides of said cell being composed of a transparent cap containing a wick moistened with an insecticidal germicidal liquid said cap housing an annular reservoir said reservoir containing an insecticidal germicidal liquid and into which liquid and into which reservoir said wick is in part inserted, an exterior cage having a frusto-conical top the margin of which top being attached to the top of said cylindrical trap and engaging passageways leading into said trap from said exterior cage, said frusto-conical top being composed of folds leading to and engaging the top of said passageways, an annular flange composed of foraminous material attached to the cylindrical base of said exterior cage, said flange projecting to the interior and being superposed above an annular convex flange, an annular opening extending between the superposed flanges, a trap comprising said flanges, said annular opening between them and recesses back of said flanges, an interior cage composed of folds of foraminous material gathered at and about a central point in the top of said cage, said folds forming the top and sides of said interior cage and forming channels in the sides of said cage on the interior of said cage leading from the base of said cage to the top of said cage to exits in the tops of said folds the base of said interior cage being attached to the base of an exterior cage and with the exterior margin of an upper annular flange as described.

2. An insect trap comprising a lower cylindrical chamber having ventilators, a trap located above said lower chamber said trap being the entrance to the main trap and consisting of two annular superposed flanges having their interior margins approximately parallel, an annular opening between said flanges communicating from the exterior to the interior of the main trap, said lower flange mounted on the top of the sides of the lower cylindrical chamber, a circular sheet of foraminous material extending above said lower chamber and attached underneath said lower flange back of the interior margin of said flange creating a recess between said sheet and said lower flange and closing insect communication to the lower cylindrical chamber, a frame extending upwardly through an interior cage into an exterior cage, said frame being attached to said lower flange by L's of the lower part of standards of said frame, a central chamber mounted in the top of said frame and said chamber including a lower well, a central trap, and an upper cell, said lower well mounted in said frame and containing an insecticidal germicidal liquid, said central trap mounted on a shoulder at the top of said well and communicating with said well, said central trap consisting of a frame having protected ventilators and having passageways leading from an exterior cage through said frame into said central trap, said passageways guarded on the interior of said central trap by folds of foraminous material arranged before said passageways, said folds having their loop ends looped away from before said passageways and said folds having their sides engaging the sides of said passageways, channels within said folds leading from the passageways through said folds to openings in the tops of said folds, an upper cell communicating with said central trap, said upper cell closed at the top and sides by a transparent cap, said cell containing a wick moistened with an insecticidal germicidal liquid and an annular reservoir holding an insecticidal germicidal liquid from which reservoir and from which liquid said wick extends, an interior cage having a base attached to the exterior margin of an upper annular flange, the sides of said interior cage consisting of channels open on the inside of said cage and leading on the inside of said cage from the bottom to the top of said cage and terminating in folds or loops gathered at the center of the top of said interior cage, said folds forming and closing the top of said interior cage excepting terminal openings in said loops said openings being exits in the top of said folds from the interior chamber to an exterior chamber, an exterior cage having a frusto-conical top folded and closed at the top about a central trap of a central chamber and fastened under an annular band about the top of said central trap and engaging passageways leading through the frame of said central trap, folds or crimps in said top leading to said passageways, the base of said exterior cage being attached to the sides of an interior cage as described.

3. The combination with a lower cylindrical chamber containing ventilators covered with foraminous material and said chamber having an annular flange with a central opening mounted on the sides of said chamber, of a circular sheet of foraminous material attached below said flange and attached to said flange back of a central opening in the flange, an interior frame attached to said flange and projecting through an interior cage into an exterior cage, a well containing an insecticidal germicidal liquid mounted in said frame, a central trap mounted on a shoulder of said well and communicating with said well, said trap having passageways from an exterior cage leading into said trap, said passageways guarded on the interior of said trap by folds by foraminous material arranged before said passageways the sides of which folds engage the sides of said passageways, a cylindrical cell communicating with said trap attached to and mounted on the top of said trap, the top and sides of said cell being a transparent cap containing a wick moistened with an insecticidal germicidal liquid said cap housing an annular reservoir holding an insecticidal germicidal liquid into which liquid and into which reservoir said wick is in part inserted, an exterior cage composed of foraminous material having a frusto-conical top the margin of which top being attached to the top of said central trap and engaging passageways leading into said central trap from said exterior cage, said frusto-conical top composed of crimps and folds leading to and engaging said passageways, an upper annular flange composed of foraminous material attached to the base of said exterior cage said flange projecting to the interior and being superposed above an annular convex flange, an annular opening extending between the superposed flanges, a trap comprising said flanges the annular opening between them and recesses back of said flanges, an interior cage composed of folds of foraminous material gathered at and about a central point in the top of said cage, said folds forming the top and sides of said interior cage and forming channels in the sides of said cage on the inside of said cage leading from the base to the top of said cage to exits in the tops of said folds, the base of said interior cage being attached to the exterior margin of an upper annular flange substantially as described.

4. An insect trap comprising a lower bait chamber, a flange projecting centrally mounted on said chamber, a sheet of foraminous material attached beneath said flange creating a suitable recess between said flange and said sheet, a well containing an insecticidal liquid suspended in a frame, a trap mounted on said well communicating with said well said trap having passage-ways from an exterior cage to the interior of said trap, a cell mounted on said trap and communicating with said trap the top and sides of said cell being a cap composed of material suitable to the admission of light said cell containing a wick moistened with an insecticidal liquid supplied from a reservoir by capillarity, the margin of the top of an exterior cage being attached to the top of said trap and engaging passage-ways leading into said trap from said exterior cage, a flange composed of foraminous material superposed above a lower flange and attached to the base of an interior cage said flange projecting centrally, an opening between said flanges leading from the exterior of the main trap to the interior, a trap comprising said flanges, said opening between them and recesses adjacent to and extending back of the interior margins of said flanges, an interior cage composed of folds forming the top and sides of said cage said folds gathered centrally in the top of said cage and forming channels in the sides of said cage leading gradually from the base of said cage to the top of said cage to exits in the tops of said folds said exits leading into an exterior cage, the sides of said interior cage being attached to the base of an exterior cage.

5. In an insect trap, a killing chamber comprising a lower well containing an insecticidal liquid, a central trap mounted on said lower well and communicating with said well, said central trap having passage-ways leading from a connected exterior cage through said trap's walls into said trap, said passage-ways guarded on the interior of said central trap by folds of foraminous material arranged before said passage-ways, said folds having their loop ends looped away from before said passage-ways and said folds having their sides engaging the sides of said passage-ways, the channels within said folds leading from the passage-ways through said folds into said central trap, an upper cell mounted on said central trap and communicating with said central trap said cell closed at the top and sides by a transparent cap, said cell containing a wick moistened with an insecticidal liquid supplied from a reservoir from which liquid and from which reservoir said wick extends.

6. In an insect trap, a killing chamber comprising a lower well containing an insecticidal liquid, a central trap mounted on said lower well and communicating with said well, said central trap having passage-ways leading from an exterior cage into said central trap, an upper cell mounted on said central trap and communicating with said trap, said upper cell closed at the top and sides by a cap composed of a material suitable for the admission of light, said cell containing a wick moistened with an insecticidal liquid.

7. In an insect trap, a killing chamber being a combination of a lower well containing an insecticidal liquid, a central trap mounted on said lower well communicating with said well, said central trap having passage-ways leading from an exterior cage into said central trap, an upper cell mounted on said central trap communicating with said trap, said upper cell closed at the top and sides by a cap composed of a material suitable for the admission of light, said cell containing a wick moistened with an insecticidal liquid supplied from a reservoir.

8. In an insect trap, a bait chamber comprising a lower chamber, a flange having a central opening said flange mounted on said chamber, a sheet of foraminous material attached beneath said flange and back of the interior margin of said flange creating a recess between said flange and said sheet, said sheet of foraminous material closing said lower chamber to insect communication with said chamber.

9. In an insect trap, a bait chamber being a combination of a lower chamber having ventilators covered with foraminous material, a sheet of foraminous material extending above said chamber closing said chamber to insect communication with said chamber, a flange resting on the sides of said chamber projecting centrally, a central opening in said flange, a recess between said flange and said sheet said recess extending back of the interior marginal edge of said flange.

10. In an insect trap, a bait protector consisting of a sheet of foraminous material attached beneath and back of the interior marginal edge of a flange at the opening of a bait chamber creating a recess between said flange and said sheet and closing said bait chamber to insect communication with said chamber.

11. In an insect trap, a bait protector being a combination of a sheet of foraminous material attached beneath and back of the interior marginal edge of a flange at the opening of a bait chamber creating a recess between said flange and said sheet and closing said bait chamber to insect communication with said chamber.

12. In an insect trap, a trap communicating with an exterior cage by means of openings in the trap leading from the exterior cage into the trap, said trap having communication with an upper cell mounted on said trap, said cell admitting light through its top and sides and closed to insect communication from the exterior, said cell containing a wick moistened with an insecticidal fluid.

13. In an insect trap, the combination of a trap communicating with an exterior cage by means of openings in said trap, said openings protected on the interior of said trap by folds of foraminous material before said openings, said folds having their loop ends looped away from before said openings and said folds having their sides engaging said openings, the channels within said folds leading from said openings into said trap.

14. In an insect trap, the combination of an interior cage trap composed of folds of foraminous material gathered centrally in the top of said cage trap, said folds forming the top and sides of said interior cage trap by creating alternate channels and ridges in the sides of said cage trap, said channels and ridges leading gradually from the base of said cage trap to the top of said cage trap to exits in the tops of said folds, or top of said trap, said exits opening from the top of the interior cage trap into an exterior cage, the base of said exterior cage being attached to the sides of said interior cage trap, a flange projecting centrally composed of foraminous material attached to the base of said interior cage trap at the exterior marginal edge of said flange, said flange superposed above a lower flange projecting centrally said lower flange mounted on a lower bait chamber, a sheet of foraminous material attached beneath said lower flange, a suitable recess between said sheet and said lower flange said sheet closing the top of said bait chamber to insect communication with said bait chamber.

WILLIAM E. D. RUMMEL.